United States Patent
Zhang et al.

(10) Patent No.: US 11,777,071 B2
(45) Date of Patent: Oct. 3, 2023

(54) COATING DEVICE, AND COATING METHOD FOR NON-UNIFORM THICKNESS CURRENT COLLECTOR

(71) Applicant: XIAMEN HITHIUM ENERGY STORAGE TECHNOLOGY CO., LTD., Xiamen (CN)

(72) Inventors: Wancai Zhang, Guangdong (CN); Junmin Feng, Guangdong (CN); Tingting Wu, Guangdong (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/882,698

(22) Filed: Aug. 8, 2022

(65) Prior Publication Data
US 2022/0384772 A1 Dec. 1, 2022

Related U.S. Application Data

(63) Continuation of application No. PCT/CN2021/071606, filed on Jan. 13, 2021.

(30) Foreign Application Priority Data

Feb. 11, 2020 (CN) .......................... 202010085740.5
Feb. 11, 2020 (CN) .......................... 202020160438.7

(51) Int. Cl.
*H01M 4/04* (2006.01)
(52) U.S. Cl.
CPC ....... *H01M 4/0404* (2013.01); *H01M 4/0411* (2013.01)

(58) Field of Classification Search
None
See application file for complete search history.

(56) References Cited

U.S. PATENT DOCUMENTS 5,989,622 A * 11/1999 Iwashita .............. H01M 4/0411
427/256

FOREIGN PATENT DOCUMENTS

| CN | 102773200 A | 11/2012 |
|---|---|---|
| CN | 108525958 A | 9/2018 |

(Continued)

OTHER PUBLICATIONS

International Search Report dated Mar. 26, 2021 in International Application No. PCT/CN2021/071606. English translation attached.

*Primary Examiner* — Charles Capozzi (57) ABSTRACT

Provided are a coating device and a coating method for a non-uniform thickness current collector. The coating device includes a thickness sensor, an offset correction controller, and an offset correction mechanism. The thickness sensor is configured to detect an abrupt thickness change point on the non-uniform thickness current collector and output an abrupt change point signal. The offset correction controller is configured to receive the abrupt change point signal, compare the received abrupt change point signal with a predetermined abrupt thickness change point signal, determine whether the non-uniform thickness current collector is offset and what an offset direction is, and transmit an offset correction signal. The offset correction mechanism is configured to receive the offset correction signal and perform an offset correction action in a direction opposite to the offset direction. This coating device uses the coating method and can accurately coat the coating areas.

15 Claims, 4 Drawing Sheets

(56) References Cited

FOREIGN PATENT DOCUMENTS

| | | |
|---|---|---|
| CN | 207810821 U | 9/2018 |
| CN | 207834445 U | 9/2018 |
| CN | 211455837 U | 9/2020 |
| JP | 2003323886 A | 11/2003 |

\* cited by examiner

COATING DEVICE, AND COATING METHOD FOR NON-UNIFORM THICKNESS CURRENT COLLECTOR

CROSS-REFERENCE TO RELATED APPLICATIONS

The present application is a continuation of International Application NO. PCT/CN2021/071606, filed on Jan. 13, 2021, which claims priority to Chinese Patent Application No. 202010085740.5, filed on Feb. 11, 2020, and Chinese Patent Application No. 202020160438.7, filed on Feb. 11, 2020, the entire contents of which are incorporated herein by reference.

FIELD

The present disclosure relates to the field of secondary battery processing technology, and in particular, to a coating device and a coating method for a non-uniform thickness current collector.

BACKGROUND

A composite current collector used in the existing secondary battery has a structure including: a polymer layer, and metal plating layers disposed on two opposite sides of the polymer layer. Each metal plating layer includes a tab area and a coating area. An active material is applied on the coating area to form an active material layer. A tab is connected to the tab area, and is configured to collect the current on the metal plating layer and conduct the collected current to an electrode terminal.

SUMMARY

The inventor found that the coating area mainly serves as an area where the active material is applied, and has a low requirement for the current-passing capability: and the tab area has a main function of ensuring the current to be smoothly conducted to the electrode terminal, and has a high requirement for the current-passing capability. In the related art, the metal plating layers of the tab area and the coating area have the same thickness, which easily leads to the problem that the tab area has an insufficient current-passing capability, while the coating area has an excessive current-passing capability. Therefore, the inventor invented a new current collector to increase the thickness of the tab area, that is, the thickness of the tab area is greater than the thickness of the coating area, and the thickness of the metal plating layer on the tab area is greater than the thickness of the metal plating layer on the coating area, so as to increase the current-passing capability of the tab area and reduce the current-passing capability of the coating area. Thereby, the performance of the secondary battery is improved, and the waste of the metal plating layer at the coating area can be reduced.

In the non-uniform thickness current collector, the coating area, which is relatively thinner, serves as an area where the active material is applied to form the active material layer, and the tab area, which is relatively thicker, is used to connect the tab. Therefore, it is necessary to accurately coat the non-uniform thickness current collector (the active material layer is only coated on the coating area, and no active material layer is coated on the tab area). The non-uniform thickness current collector may have an occurrence of offset during the conveying process. If the non-uniform thickness current collector is offset, the active material will be present in the tab area, while no or reduced active material will be present in the coating area, and then the active material cannot be accurately coated.

The purpose of the present disclosure is to provide a coating device and a coating method for a non-uniform thickness current collector, which can accurately coat the non-uniform thickness current collector and avoid coating the tab area with unnecessary active material.

In a first aspect, embodiments of the present disclosure provide a coating device for coating a non-uniform thickness current collector with an active material. The non-uniform thickness current collector includes coating areas and tab areas. The coating areas alternate with the tab areas along a width direction of the non-uniform thickness current collector. The coating areas and the tab areas all extend along a length direction of the non-uniform thickness current collector. A thickness of each tab area is greater than a thickness of each coating area. The coating device includes a thickness sensor, an offset correction controller, and an offset correction mechanism. The thickness sensor is configured to detect an abrupt thickness change point on the non-uniform thickness current collector and output an abrupt change point signal. The offset correction controller can receive the abrupt change point signal, and can compare the received abrupt change point signal with a predetermined abrupt thickness change point signal and then determine whether the non-uniform thickness current collector is offset and what an offset direction is according to the comparison result, and transmit an offset correction signal. The offset correction mechanism and the thickness sensor are arranged in sequence along a conveying path of the non-uniform thickness current collector. The offset correction mechanism is configured to receive the offset correction signal and perform an offset correction action in a direction opposite to the offset direction.

The thickness sensor firstly detects the thickness change point of the non-uniform thickness current collector and transmits the abrupt change point signal of the abrupt thickness change point to the offset collection controller. After the collection controller determines the offset direction of the non-uniform thickness current collector, the correction controller transmits the offset correction signal to the offset correction mechanism. The offset correction mechanism collects the offset of the non-uniform thickness current collector in a direction opposite to the offset direction, so that the offset of the conveying of the non-uniform thickness current collector can be corrected in time and the non-uniform thickness current collector can be accurately coated subsequently.

In a preferred embodiment of the present disclosure, the thickness sensor is configured to detect the abrupt thickness change point on the non-uniform thickness current collector and output an abrupt voltage change signal. The offset correction controller is configured to receive the abrupt voltage change signal, compare the received abrupt voltage change signal with a predetermined abrupt voltage change signal, and determine whether the non-uniform thickness current collector is offset and what the offset direction is according to the comparison result, and transmit the offset correction signal.

Whether the non-uniform thickness current collector is offset and the offset direction are determined through the transmission and comparison of the abrupt voltage change signal, so that the offset direction of the non-uniform thickness current collector can be quickly determined. Then the offset of the non-uniform thickness current collector can be corrected, which is conducive to the subsequent accurate coating of the non-uniform thickness current collector.

In a preferred embodiment of the present disclosure, the coating device further includes a position sensor that is synchronously movable with the thickness sensor. The position sensor is configured to detect a position of the abrupt thickness change point on the non-uniform thickness current collector and output a position signal. The offset correction controller is configured to receive the position signal indicating the abrupt thickness change point, compare the received position signal with a predetermined abrupt thickness change point position signal, determine whether the non-uniform thickness current collector is offset and what the offset direction is according to the comparison result, and transmit the offset correction signal.

The thickness sensor is synchronously movable with the position sensor. When the thickness sensor detects the abrupt thickness change point, the position sensor synchronously detects the position of the abrupt thickness change point and outputs the position signal indicating the abrupt thickness change point. Then whether the non-uniform thickness current collector is offset and the offset direction are determined through the transmission and comparison of the position signal. If the position of the abrupt thickness change point is offset to the left, the offset correction controller controls the offset correction mechanism to correct the offset towards the right; if the position of the abrupt thickness change point is offset to the right, the offset correction controller controls the offset correction mechanism to correct the offset towards the left, to correct the offset of the non-uniform thickness current collector, and facilitate subsequent accurate coating of the non-uniform thickness current collector.

In a preferred embodiment of the present disclosure, the thickness sensor is configured to reciprocate in a width direction of the non-uniform thickness current collector and is located at a surface of the non-uniform thickness current collector. The thickness sensor is configured to output the abrupt change signal in response to detecting a first abrupt thickness change point when scanning for a period. The offset correction controller is configured to, subsequent to receiving the abrupt change point signal, calculate timing of appearance of the abrupt change point signal, and compare the timing with predetermined timing of appearance of the abrupt change point signal, determine whether the non-uniform thickness current collector is offset and what the offset direction is, and transmit the offset correction signal.

If the timing of appearance of the abrupt change point signal calculated by the offset correction controller is longer than the predetermined timing, indicating that the non-uniform thickness current collector is offset away from a starting position of the thickness sensor, then the offset correction controller controls the offset correction mechanism to correct the offset towards the starting position of the thickness sensor, and thus the offset of the non-uniform thickness current collector is corrected towards the starting position of the thickness sensor. If the timing of appearance of the abrupt thickness change point signal calculated by the offset correction controller is shorter than the predetermined timing, indicating that the non-uniform thickness current collector is offset towards the starting position of the thickness sensor, then the offset correction controller controls the offset correction mechanism to correct the offset in a direction away from the starting position of the thickness sensor, and thus the offset of the non-uniform thickness current collector is corrected in a direction away from the starting position of the thickness sensor.

In a preferred embodiment of the present disclosure, the thickness sensor is configured to detect abrupt thickness change points on the non-uniform thickness current collector and output a plurality of abrupt voltage change values. When the thickness sensor detects a thickness decrease of the non-uniform thickness current collector, an abrupt voltage change value corresponding to the thickness decrease is a positive value or a negative value, and when the thickness sensor detects a thickness increase of the non-uniform thickness current collector, an abrupt voltage change value corresponding to the thickness increase is a negative value or a positive value. The offset correction controller is configured to, subsequent to receiving the plurality of abrupt voltage change values, compare a number of positive values among the plurality of abrupt voltage change values with a predetermined number of positive values, compare a number of negative values among the plurality of abrupt voltage change values with a predetermined number of negative values, and determine the offset direction of the non-uniform thickness current collector according to the comparison results.

The number of abrupt voltage change values is directly compared with the predetermined number of abrupt voltage change values, and the offset direction of the non-uniform thickness current collector is more accurately calculated, facilitating the correction of the offset.

In a preferred embodiment of the present disclosure, along the conveying path, the offset correction mechanism is located upstream of the thickness sensor. During the conveying process, the non-uniform thickness current collector first passes by the offset correction mechanism, and then passes by the thickness sensor. When the thickness sensor detects that the conveying of the non-uniform thickness current collector is offset, the offset collection controller controls the offset correction mechanism to correct the offset. The corrected non-uniform thickness current collector will be conveyed to the thickness sensor, and then the abrupt thickness change point detection, transmission and comparison, etc., can be performed, which can timely detect whether the offset correction mechanism corrects the offset into place or too much, to apply further offset correction modification.

In a preferred embodiment of the present disclosure, the coating device further includes a coating back roller and a coating die head. The conveying path passes by a peripheral surface of the coating back roller, and the coating back roller is located downstream of the thickness sensor. The coating die head faces towards a part of the conveying path on the coating back roller.

After the offset of the non-uniform thickness current collector is corrected, the non-uniform thickness current collector is conveyed to the coating back roller, and the coating area is coated by the coating die head, so that areas coated by the coating die head are all coating areas, and the coating is accurate.

In a preferred embodiment of the present disclosure, the coating device further includes a tension blocking mechanism located in the conveying path, and the tension blocking mechanism is located between the thickness sensor and the coating back roller.

The tension blocking mechanism is arranged upstream of the coating back roller, which can prevent the tension fluctuation of the passing roller upstream from causing the substrate on the coating back roller to wrinkle, affecting the coating effect or forming a broken strip.

In a preferred embodiment of the present disclosure, the tension blocking mechanism includes a drive roller and a press roller. The conveying path passes through between the drive roller and the press roller. The press roller is configured to apply a pressure on the non-uniform thickness current collector in the conveying path.

Through the cooperative setting of the drive roller and the press roller, the non-uniform thickness current collector can be better blocked from tension, and after the tension is blocked, the substrate wrinkles at the coating back roller can be further avoided, and the coating effect is better.

In a preferred embodiment of the present disclosure, an outer diameter of the drive roller is greater than an outer diameter of the press roller, and the conveying path forms a wrapping angle on the drive roller.

Therefore, the space occupied by the coating device is saved while the wrinkling of the non-uniform thickness current collector is avoided.

In a preferred embodiment of the present disclosure, the coating device further includes a first passing roller. The conveying path passes by a peripheral surface of the first passing roller. The first passing roller is located between the thickness sensor and the tension blocking mechanism. A length of the conveying path between the drive roller and the coating back roller is smaller than a length of the conveying path between the drive roller and the first passing roller.

The distance between the chive roller and the tension blocking mechanism is small, no other passing rollers that cause tension fluctuations is present, and the tension is more stable, facilitating subsequent coating.

In a second aspect, embodiments of the present disclosure provide a coating method for a non-uniform thickness current collector, applied in the above-mentioned coating device. The coating method includes the following operations. The non-uniform thickness current collector is arranged on a conveying path. The non-uniform thickness current collector passes by an offset correction mechanism and a thickness sensor. The thickness sensor is used to detect an abrupt thickness change point of the non-uniform thickness current collector and output an abrupt change point signal. An offset collection controller receives the abrupt change point signal, compares the abrupt change point signal with a predetermined abrupt thickness change point, determines an offset direction of the non-uniform thickness current collector, and transmits an offset correction signal. An offset correction mechanism receives the offset correction signal, and applies an offset correction action in a direction opposite to the offset direction.

Therefore, the offset of the non-uniform thickness current collector can be collected in time, and the non-uniform thickness current collector can be coated accurately.

In a third aspect, embodiments of the present disclosure provide a coating device for coating a non-uniform thickness current collector with an active material to form an active material layer. The non-uniform thickness current collector includes coating areas and tab areas. The coating areas alternate with the tab areas along a length direction of the non-uniform thickness current collector. The coating areas and the tab areas all extend along a width direction of the non-uniform thickness current collector. A thickness of each tab area is greater than a thickness of each coating area. The coating device includes a thickness sensor and a coating back roller that are sequentially arranged along a conveying path of the non-uniform thickness current collector. The thickness sensor is configured to detect a thickness of the non-uniform thickness current collector. The coating device further includes a coating die head configured to coat the non-uniform thickness current collector; and a coating controller configured to control the coating die head to be turned on or turned off. The coating controller is electrically connected to the thickness sensor. The coating back roller has a coating region. The thickness sensor is configured to obtain a first signal in response to detecting a thickness decrease of the non-uniform thickness current collector at an inlet end of the coating region, and transmit the first signal to the coating controller to allow the coating controller to control the coating die head to be turned on. The thickness sensor is further configured to obtain a second signal in response to detecting a thickness increase of the non-uniform thickness current collector at the inlet end of the coating region, and transmit the second signal to the coating controller to allow the coating controller to control the coating die head to be turned off.

When the non-uniform thickness current collector passes by the coating back roller, because the coating areas alternate with the tab areas, no coating is performed when the tab area passes by the coating back roller, and the coating is performed when the coating area passes by the coating back roller. With the setting of the thickness sensor, it is capable to determine whether a position of the non-uniform thickness current collector passing through the coating back roller is the coating area or the tab area, and accordingly the coating area can be accurately coated by controlling the turning on or turning off of the coating die head.

In a fourth aspect, embodiments of the present disclosure provide a coating method for a non-uniform thickness current collector, applied in the above coating device. The coating method includes the following operations. The non-uniform thickness current collector is arranged on the conveying path. The non-uniform thickness current collector passes by the thickness sensor and the coating back roller. The thickness sensor obtains a first signal in response to detecting a thickness decrease of the non-uniform thickness current collector at an inlet end of the coating region, and transmits the first signal to the coating controller, and the coating controller controls the coating die head to be turned on. The thickness sensor obtains the second signal in response to detecting a thickness increase of the non-uniform thickness current collector at the inlet end of the coating region, and transmits the second signal to the coating controller, and the coating controller controls the coating die head to be turned off.

Therefore, it is capable to determine whether a position of the non-uniform thickness current collector passing through the coating back roller is the coating area or the tab area, and accordingly the coating area can be accurately coated by controlling the turning on or turning off of the coating die head.

BRIEF DESCRIPTION OF DRAWINGS

In order to clearly explain technical solutions of embodiments of the present disclosure, drawings used in the embodiments are briefly described below. It should be understood that the drawings below merely illustrate some embodiments of the present disclosure and therefore should not be regarded as a limitation on the scope. Based on these drawings, other drawings obtained by those skilled in the art without inventive effort belong to the protection scope of the present disclosure.

Reference numbers: 10—non-uniform thickness current collector; 11—insulating layer; 12—first conductive layer; 13—second conductive layer; 121—coating area; 122—tab area; 20—coating device; 21—offset correction mechanism; 22—thickness sensor; 23—first passing roller; 24—tension blocking mechanism; 25—coating mechanism; 251—coating back roller; 252—coating die head; 2521—nozzle; 2522—shielding portion; 221—first sensor; 222—second sensor; 223—frame body; 211—first offset correction roller; 212—second offset correction roller; 26—second passing roller; 241—drive roller; 242—press roller.

DESCRIPTION OF EMBODIMENTS

In order to make the purposes, technical solutions and advantages of the embodiments of the present disclosure clearer, the technical solutions in the embodiments of the present disclosure will be described below with reference to the accompanying drawings in the embodiments of the present disclosure.

Figure 1:
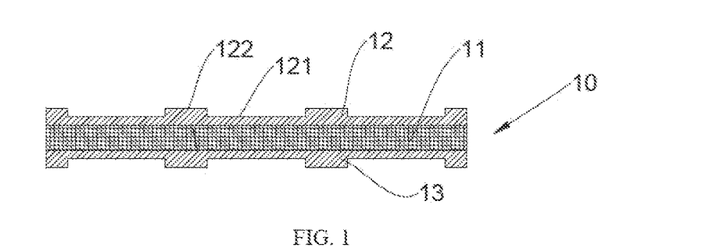
FIG. 1 is a schematic diagram of a layered structure of a non-uniform thickness current collector.

FIG. 1 is a schematic diagram of a layered structure of a non-uniform thickness current collector 10. Here, the non-uniform thickness current collector refers to a current collector having a non-uniform thickness. Referring to FIG. 1, the non-uniform thickness current collector 10 has a three-layer structure, and specifically, includes an insulating layer 11 as the middle layer, a first conductive layer 12, and a second conductive layer 13, the first conductive layer 12 and the second conductive layer 13 being located on two opposite sides of the insulating layer 11. The first conductive layer 12 and the second conductive layer 13 each include coating areas 121 and tab areas 122. The coating areas 121 alternate with the tab areas 122. The coating area 121 is an area where an active material is applied to form an active material layer, and the tab area 122 is configured to be connected to the tabs. In order to improve the current-passing capability of the tab areas 122 and avoid an excessive current-passing capability of the coating area 121, the inventor designed a non-uniform thickness current collector 10.

The non-uniform thickness current collector 10 means that the thicknesses of the first conductive layer 12 corresponding to the tab area 122 is unequal to the thicknesses of the first conductive layer 12 corresponding to the coating area 121, and the thicknesses of the second conductive layer 13 corresponding to the tab area 122 is unequal to the thicknesses of the second conductive layer 13 corresponding to the coating area 121. The thickness of the tab area 122 is greater than the thickness of the coating area 121, facilitating to connect the tab at the tab area 122, and coat the active material at the coating area 121 to form the active material layer. In order to coat the active material layer on the coating area 121 of the non-uniform thickness current collector 10, the inventor improved the coating device 20, as follows.

Figure 2:
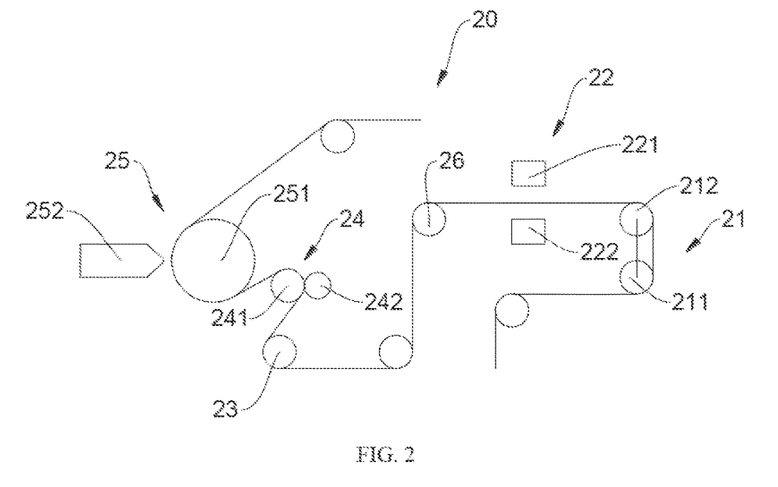
FIG. 2 is a schematic structural diagram of a coating device.

FIG. 2 is a schematic structural diagram of the coating device 20. Referring to FIG. 2, the coating device 20 includes an unwinding roller (not shown), an offset correction mechanism 21, an offset correction controller (not shown), a thickness sensor 22, a first passing roller 23, a tension blocking mechanism 24, a coating mechanism 25, and a winding roller (not shown). A roll material of the non-uniform thickness current collector 10 is unwound on the unwinding roller, is conveyed along a conveying path through the offset correction mechanism 21, the thickness sensor 22, the first passing roller 23, the tension blocking mechanism 24, and the coating mechanism 25, and is wound by the winding roller.

In the embodiments of the present disclosure, the coating mechanism 25 includes a coating back roller 251 and a coating die head 252, the conveying path passes by a peripheral surface of the coating back roller 251, and the coating die head 252 faces towards the conveying path on the coating back roller 251. That is to say, when being conveyed, the non-uniform thickness current collector 10 covers at least a part of the peripheral surface of the coating back roller 251, and the coating die head 252 applies a slurry to the coating areas 121 of the non-uniform thickness current collector 10 on the peripheral surface of the coating back roller 251. A certain distance is present between the coating die head 252 and the non-uniform thickness current collector 10 on the coating back roller 251, and the slurry can be uniformly sprayed on the non-uniform thickness current collector 10.

As for a first coating method, the non-uniform thickness current collector 10 is a long roll material with a certain width, and the coating areas 121 and the tab areas 122 each extend along a length direction of the non-uniform thickness current collector 10. That is to say, when the non-uniform thickness current collector 10 is arranged on the coating device 20, the extending directions of the coating areas 121 and the tab areas 122 are consistent with the conveying direction of the non-uniform thickness current collector 10.

Figure 3:
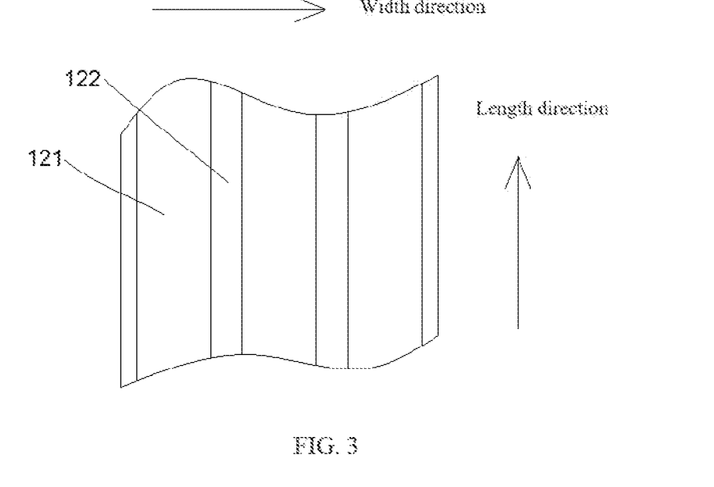
FIG. 3 is a schematic diagram of a first plane structure of a non-uniform thickness current collector.

FIG. 3 is a schematic diagram of a first plane structure of the non-uniform thickness current collector 10. Referring to FIG. 3, the length direction indicated by the arrow in the figure is the extending directions of the tab areas 122 and the coating areas 121. The coating areas 121 alternate with the tab areas 122 along a width direction of the non-uniform thickness current collector 10. After the non-uniform thickness current collector 10 is arranged on the coating device 20, the conveying direction of the non-uniform thickness current collector 10 is the length direction of the non-uniform thickness current collector 10.

Figure 4:
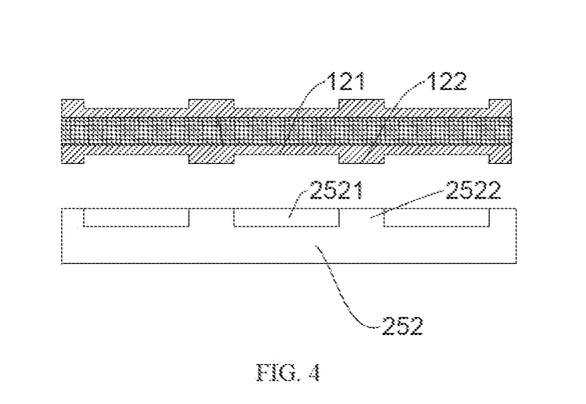
FIG. 4 is a schematic diagram of a first position configuration in which a coating die head corresponds to a non-uniform thickness current collector.

FIG. 4 is a schematic diagram of a first position configuration in which the coating die head 252 corresponds to the non-uniform thickness current collector 10. Referring to FIG. 4, after the non-uniform thickness current collector 10 is positioned on the peripheral surface of the coating back roller 251, the cross segment of the non-uniform thickness current collector 10 is shown in FIG. 4. In order to coat the coating area 121 of the non-uniform thickness current collector 10 with the active material layer and in order to avoid applying the active material layer on the tab area 122 of the non-uniform thickness current collector 10, the structure of the coating die head 252 is set as follows. As shown in FIG. 4, the coating die head 252 has a plurality of nozzles 2521 arranged at intervals. The nozzles 2521 each correspond to a coating area 121, so as to coat the coating area 121 with the active material layer. A shielding portion 2522 is arranged between two adjacent nozzles 2521, and the shielding portion 2522 corresponds to the tab area 122, avoiding applying the active material layer on the tab area 122.

In the embodiments of the present disclosure, the offset correction mechanism 21 is controlled by the offset correction controller to correct an offset of the conveying path of the non-uniform thickness current collector 10. The offset correction controller is electrically connected to the thickness sensor 22 and the offset correction mechanism 21. With the matching setting of the thickness sensor 22, the offset correction controller, and the offset correction mechanism 21, the nozzles 2521 of the coating die head 252 correspond to the coating areas 121 of the non-uniform thickness current collector 10 after the non-uniform thickness current collector 10 is conveyed onto the coating back roller 251, which facilitates accurate coating.

In view of the thickness difference between the coating area 121 and the tab area 122 in the non-uniform thickness current collector 10, the thickness sensor 22 is located at a surface of the non-uniform thickness current collector 10, and the thickness sensor 22 can reciprocate in the width direction of the non-uniform thickness current collector 10. The thickness sensor 22 is configured to detect an abrupt thickness change point on the non-uniform thickness current collector 10. The thickness sensor 22 can detect a position of the non-uniform thickness current collector 10 with a thickness difference, and outputs an abrupt change point signal. The offset correction controller is configured to receive the abrupt change point signal and compare the abrupt change point signal with a predetermined abrupt thickness change point signal to determine whether the non-uniform thickness current collector 10 is offset and what an offset direction is, and transmits an offset correction signal. The offset correction mechanism 21 is configured to receive the offset collection signal, and performs an offset correction action in a direction opposite to the offset direction.

For example: the thickness sensor 22 transmits a first abrupt change point signal to the offset correction controller in response to detecting an abrupt thickness change point on the non-uniform thickness current collector 10 (here, the first abrupt change point signal is defined in order to be distinguished from the subsequent second abrupt change point signal, and does not mean one abrupt change point signal). After receiving the first abrupt change point signal, the offset correction controller compares the first abrupt change point signal with a predetermined abrupt thickness change point signal corresponding to the first abrupt change point signal and determines that the non-uniform thickness current collector 10 is offset to the right, and then the offset correction controller transmits a first offset correction signal to the offset correction mechanism 21 (here, the first offset correction signal is defined only to be distinguished from the subsequent second offset correction signal, but should not be understood as indicating or implying relative importance). After receiving the first offset correction signal, the offset correction mechanism 21 corrects the offset of the non-uniform thickness current collector 10 towards the left.

The thickness sensor 22 transmits a second abrupt change point signal to the offset collection controller in response to detecting an abrupt thickness change point on the non-uniform thickness current collector 10. After receiving the second abrupt change point signal, the offset correction controller compares the second abrupt change point signal with a predetermined abrupt thickness change point signal corresponding to the second abrupt change point signal and determines that the non-uniform thickness current collector 10 is offset to the left, and then the offset correction controller transmits a second offset correction signal to the offset correction mechanism 21. After receiving the second offset correction signal, the offset correction mechanism 21 collects the offset of the non-uniform thickness current collector 10 towards the right.

In the embodiments of the present disclosure, the thickness sensor 22 may be a laser thickness sensor, an eddy-current thickness sensor, a magnetic thickness sensor, a capacitive thickness sensor, an ultrasonic thickness sensor, and the like, which is not limited herein.

Optionally, the thickness sensor 22 is configured to detect an abrupt thickness change point on the non-uniform thickness current collector 10 and output an abrupt voltage change signal. After receiving the abrupt voltage change signal, the offset correction controller compares the abrupt voltage change signal with a predetermined abrupt voltage change signal to determine whether the non-uniform thickness current collector 10 is offset and what the offset direction is.

Further, the thickness sensor 22 is configured to detect abrupt thickness change points on the non-uniform thickness current collector 10 and output a plurality of abrupt voltage change values. When the thickness sensor 22 detects a thickness decrease of the non-uniform thicknesses current collector, the abrupt voltage change value corresponding to the thickness decrease is a positive value or a negative value. When the thickness sensor 22 detects a thickness increase of the non-uniform thickness current collector, the abrupt voltage change value corresponding to the thickness increase is a negative value or a positive value. For example, when the thickness sensor 22 detects a thickness decrease of the non-uniform thickness current collector, the abrupt voltage change value corresponding to the thickness decrease is a positive value; and when the thickness sensor 22 detects a thickness increase of the non-uniform thickness current collector, the abrupt voltage change value corresponding to the thickness increase is a negative value. Alternatively, when the thickness sensor 22 detects a thickness decrease of the non-uniform thickness current collector, the abrupt voltage change value corresponding to the thickness decrease to a negative value; and when the thickness sensor 22 detects a thickness increase of the non-uniform thickness current collector, the abrupt voltage change value corresponding to the thickness increase is a positive value. After the offset correction controller receives the plurality of abrupt voltage change values, the offset correction controller compares a number of positive values among the plurality of abrupt voltage change values with a predetermined number of positive values and compares a number of negative values among the plurality of abrupt voltage change values with a predetermined number of negative values to determine the offset direction of the non-uniform thickness current collector 10.

Figure 5:
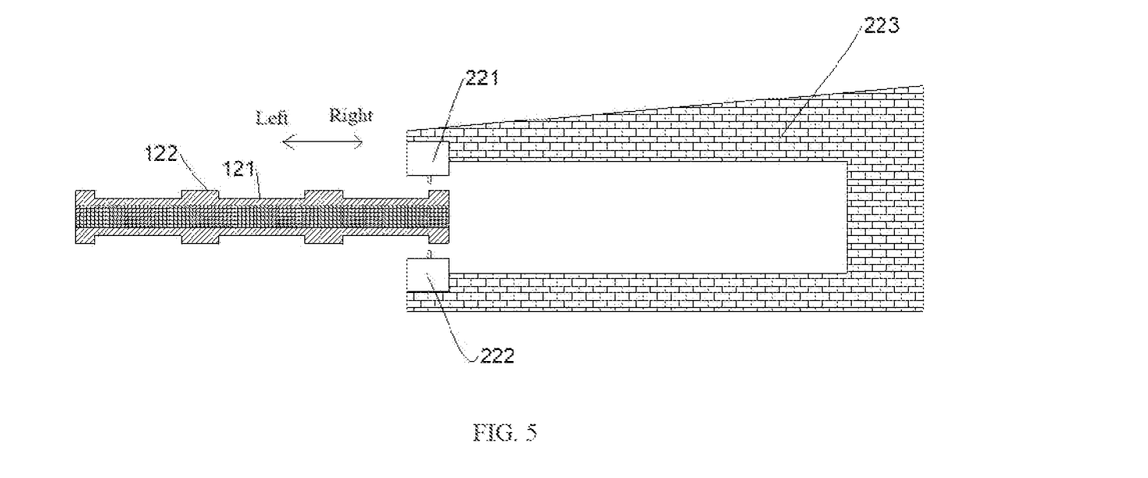
FIG. 5 is a schematic diagram of a position configuration in which an eddy-current thickness sensor corresponds to a non-uniform thickness current collector.

For illustration below, the thickness sensor 22 is an eddy-current thickness sensor as an example. FIG. 5 is a schematic diagram of a position configuration in which the eddy-current thickness sensor corresponds to the non-uniform thickness current collector 10. Referring to FIG. 5, the eddy-current thickness sensor includes a first sensor 221, a second sensor 222, and a frame body 223. The frame body 223 is of a U-shaped structure. The first sensor 221 and the second sensor 222 are arranged at two ends of the U-shaped structure, respectively. Both the first sensor 221 and the second sensor 222 are arranged on an inner side of the U-shaped structure.

A method for detecting the thickness of the non-uniform thickness current collector 10 by the eddy-current thickness sensor includes: allowing the frame body 223 of the U-shaped structure to reciprocate in a left-right direction, to enable the first sensor 221 and the second sensor 222 to scan the non-uniform thickness current collector 10 back and forth in the left-right direction. When the eddy-current thickness sensor scans an abrupt thickness change point of the non-uniform thickness current collector 10, a distance between a sensor probe and the non-uniform thickness current collector 10 will change, which will cause a change of an output voltage of the eddy-current thickness sensor.

Figure 6:
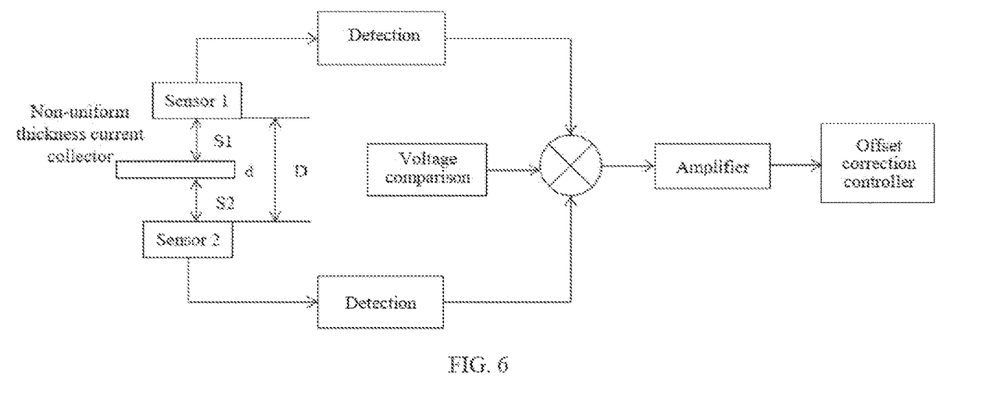
FIG. 6 is a principle block diagram of an eddy-current thickness sensor.

FIG. 6 is a principle block diagram of an eddy-current thickness sensor. Referring to FIG. 5 and FIG. 6, a distance S1 between an outer surface of the first conductive layer 12 of the non-uniform thickness current collector 10 and the sensor probe of the first sensor 221 is detected by the first sensor 221, a distance S2 between an outer surface of the second conductive layer 13 of the non-uniform thickness current collector 10 and the sensor probe of the second sensor 222 is detected by the second sensor 222, and a distance between the first sensor 221 and the second sensor 222 is a fixed value D. The thickness of the non-uniform thickness current collector 10 is d, where $d=D-(S1+S2)$. When the scanning is performed within the tab area 122 or the coating area 121, d is a constant value; when the scanning is performed from the tab area 122 to the coating area 121, the value of (S1+S2) increases, and the value of d decreases; and when the scanning is performed from the coating area 121 to the tab area 122, the value of (S1+S2) decreases, and the value of d increases. The output voltage will change in response to the increase or decrease of the value of d. By comparing the output voltage with the predetermined voltage, a voltage difference is obtained, and the voltage difference is transmitted to the offset correction controller as an output signal after passing through an amplifier.

Referring to FIG. 5 again, the frame body 223 reciprocates in the left-right direction. For example, a first period is defined as a period for the frame body 223 moving from a leftmost position to a rightmost position, and a second period is defined as a period for the frame body 223 moving from the rightmost position to the leftmost position. When the frame body 223 moves in the first period, there are three positions having a change from the tab area 122 to the coating area 121, and there are also three positions having a change from the coating area 121 to the tab area 122. When the frame body 223 moves for the first period, there are a total of six abrupt thickness change points where the abrupt voltage change signal appears. For example, when the abrupt voltage change value is a positive value, the first sensor 221 and the second sensor 222 detect a change from a thinner coating area 121 to a thicker tab area 122; and when the abrupt voltage change value is negative, the first sensor 221 and the second sensor 222 detect a change from a thicker tab area 122 to a thinner coating area 121. Under normal circumstances, during the whole process of the frame body 223 moving from the leftmost position to the rightmost position, the frame body 223 starts to move from the leftmost position; when the sensor probe of the first sensor 221 and the sensor probe of the second sensor 222 scan from the tab area 122 to the coating area 121, the abrupt voltage change is a negative value; and when the frame body 223 moves to the rightmost position, and the sensor probe of the first sensor 221 and the sensor probe of the second sensor 222 scan from the coating area 121 to the tab area 122, the abrupt voltage change is a positive value. After the frame body 223 moves from the leftmost position to the rightmost position to complete the first period of movement, the first sensor 221 and the second sensor 222 transmit six abrupt voltage change values to the offset correction controller, which are three positive values and three negative values. After receiving the six abrupt voltage change values, the offset correction controller compares them with the predetermined abrupt voltage change values to find out that the predetermined abrupt voltage change values are also three positive values and three negative values, which indicates that the conveying of the non-uniform thickness current collector 10 has not been offset, and it is not necessary to control the offset correction mechanism 21 to perform the offset correcting action.

If the conveying of the non-uniform thickness current collector 10 is offset to the right, after the frame body 223 starts to move from the leftmost position, the sensor probe of the first sensor 221 and the sensor probe of the second sensor 222 cannot detect the abrupt thickness change point from the rightmost coating area 121 to the rightmost tab area 122. After the frame body 223 moves from the leftmost position to the rightmost position to complete the first period of movement, the first sensor 221 and the second sensor 222 transmit five abrupt voltage change values to the offset correction controller, which are two positive values and three negative values. After receiving the five abrupt voltage change values, the offset correction controller compares them with the predetermined abrupt voltage change values to find out that the detected abrupt voltage change values are one positive value fewer than the predetermined abrupt voltage change values, where the predetermined abrupt voltage change values are three positive values and three negative values, which indicates that the conveying of the non-uniform thickness current collector 10 has been offset to the right. The offset correction controller transmits a first correction signal to the offset correction mechanism 21. After receiving the first correction signal, the offset correction mechanism 21 corrects the offset of the non-uniform thickness current collector 10 towards the left.

If the conveying of the non-uniform thickness current collector 10 is offset to the left, after the frame body 223 starts to move from the leftmost position, the sensor probe of the first sensor 221 and the sensor probe of the second sensor 222 cannot detect the abrupt thickness change point from the leftmost tab area 122 to the leftmost coating area 121. After the frame body 223 moves from the leftmost position to the rightmost position to complete the first period of movement, the first sensor 221 and the second sensor 222 transmit five abrupt voltage change values to the offset correction controller, which are three positive values and two negative values. After receiving the above five abrupt voltage change values, the offset correction controller compares them with the predetermined abrupt voltage change values to find out that the detected abrupt voltage changes are one negative value fewer than the predetermined abrupt voltage change values, where the predetermined abrupt voltage change values are three positive values and three negative values, which indicates that the conveying of the non-uniform thickness current collector 10 is offset to the left. The offset correction controller transmits a second correction signal to the offset correction mechanism 21. After receiving the second correction signal, the offset collection mechanism 21 corrects the offset of the non-uniform thickness current collector 10 towards the right.

In another embodiment, the thickness sensor 22 reciprocates in the width direction of the non-uniform thickness current collector 10 and is located at the surface of the non-uniform thickness current collector 10. When the thickness sensor 22 detects a first abrupt thickness change point when scanning for a period, the thickness sensor 22 outputs an abrupt change signal. After the offset collection controller receives the abrupt change point signal, the offset correction controller calculates timing of appearance of the abrupt change point signal, and compares the timing with predetermined abrupt change point signal appearance timing to determine the offset direction of the non-uniform thickness current collector 10 and transmits an offset collection signal.

If the tuning of appearance of the abrupt thickness change point calculated by the offset correction controller is longer than the predetermined timing, indicating that the non-uniform thickness current collector 10 is offset away from a starting position of the thickness sensor 22, then the offset correction controller controls the offset collection mechanism 21 to correct the offset towards the starting position of the thickness sensor 22, and thus the offset of the non-uniform thickness current collector 10 is corrected towards the starting position of the thickness sensor. If the timing of appearance of the abrupt thickness change point calculated by the offset correction controller is shorter than the predetermined timing, indicating that the uniform thickness current collector 10 is offset towards the starting position of the thickness sensor 22, then the offset correction controller controls the offset correction mechanism 21 to collect the offset in a direction away from the starting position of the thickness sensor 22, and thus the offset of the non-uniform thickness current collector 10 is corrected in the direction away from the starting position of the thickness sensor.

Please continue to refer to FIG. 5. The thickness sensor 22 is an eddy-current thickness sensor, and the frame body 223 reciprocates in a left-right direction. For example, one period is defined as a period for the frame body 223 moving from the rightmost position to the leftmost position and then from the leftmost position to the rightmost position. When the abrupt voltage change value is a negative value, the first sensor 221 and the second sensor 222 detect a change from a thicker tab area 122 to a thinner coating area 121. When the frame body 223 reciprocates, a first abrupt thickness change point detected the first sensor 221 and the second sensor 222 is an abrupt change point from a thicker tab area 122 to a thinner coating area 121, corresponding to a negative abrupt voltage change value, and the first sensor 221 and the second sensor 222 transmit the voltage signal to the offset collection controller. When the first sensor 221 and the second sensor 222 detects the first thickness changes point, the offset collection controller can calculate movement time (a time interval from a start point of the movement of the first sensor 221 and the second sensor 222 to the first thickness change point) of the frame body 223.

Optionally, if the conveying of the non-uniform thickness current collector 10 has not been offset, and the predetermined time is 1 s, during one period of movement of the frame body 223, the movement time of the first sensor 221 and the second sensor 222 from the rightmost position to the first abrupt thickness change point is 1 s. If the conveying of the non-uniform thickness current collector 10 is offset to the left, the timing of appearance of the first abrupt thickness change point is prolonged (more than 1 s), for example: 1.5 s, and the offset correction controller transmits the offset collection signal to control the offset correction mechanism 21 to correct the offset towards the right. If the conveying of the non-uniform thickness current collector 10 is offset to the right, the timing of appearance of the first abrupt thickness change point is shortened (less than 1 s), for example: 0.5 s, and the offset correction controller transmits the offset collection signal to control the offset correction mechanism 21 to correct the offset towards the left. Every time when the frame body 223 completes one period of movement, the calculation in the offset collection controller returns to zero, and when the frame body 223 moves within another period, the counting is performed again to perform real-time offset correction for the non-uniform thickness current collector 10.

In other embodiments, a position sensor that is synchronously movable with the thickness sensor 22 is further included. The position sensor is electrically connected to the offset correction controller. The position sensor is configured to detect a position of the abrupt thickness change point on the non-uniform thickness current collector 10 and output a position signal indicating the abrupt thickness change point. The offset collection controller receives the position signal indicating the abrupt thickness change point and compares the position signal of the abrupt thickness change point with a predetermined abrupt thickness change point position signal to determine the offset direction of the non-uniform thickness current collector 10 and transmits the offset correction signal.

The thickness sensor 22 is synchronously movable with the position sensor, and the thickness sensor 22 cooperates with the position sensor. When the thickness sensor 22 detects an abrupt thickness change point, the position sensor detects a position of the abrupt thickness change point synchronously. Then the offset correction controller compares the position of the abrupt thickness change point with the predetermined abrupt thickness change point position. If the position of the abrupt thickness change point is offset to the left, the offset correction controller controls the offset correction mechanism 21 to correct the offset towards the right; and if the position of the abrupt thickness change point is offset to the right, the offset correction controller controls the offset correction mechanism 21 to correct the offset toward the left.

Please continue to refer to FIG. 5. The frame body 223 reciprocates in a left-right direction. For example, one period is defined as a period for the frame body 223 moving from the rightmost position to the leftmost position and then from the leftmost position to the rightmost position. When the abrupt voltage change value is a negative value, the first sensor 221 and the second sensor 222 detect a change from a thicker tab area 122 to a thinner coating area 121; and when the abrupt voltage change value is a positive value, the first sensor 221 and the second sensor 222 detect a change from a thinner coating area 121 to a thicker tab area 122. When the thickness sensor 22 detects a negative abrupt voltage change value, the position sensor synchronously detects the position of the abrupt thickness change point. Both the thickness sensor 22 and the position sensor transmit signals to the offset correction controller, and the offset correction controller can correspond the abrupt thickness change point detected by the thickness sensor 22 to the position of the abrupt change point, and correspond them to a predetermined abrupt thickness change point and the predetermined abrupt change point position, to determine whether the conveying of the non-uniform thickness current collector 10 is offset.

Optionally, if the conveying of the non-uniform thickness current collector 10 is not offset, and when the frame body 223 has moved for one period, the points, where the abrupt voltage change is a negative value, detected by the thickness sensor 22 correspond to respective positions in one-to-one correspondence, each position being a first predetermined position signal; and the points, where the abrupt voltage change is a positive value, detected by the thickness sensor 22 correspond to respective positions in one-to-one correspondence, each position being a second predetermined position signal.

If the conveying of the non-uniform thickness current collector 10 is offset to the left, the point where the abrupt voltage change is a negative value is offset to the left. Accordingly, the position of the point, where the abrupt voltage change is a negative value, detected by the position sensor is a first position signal and the first position signal is transmitted to the offset correction controller; and the offset correction controller compares the first position signal with the first predetermined position signal to find out that the position is offset to the left (the position of the point, where the abrupt voltage change is a positive value, detected by the position sensor is a second position signal and the second position signal is transmitted to the offset correction controller; and the offset collection controller compares the second position signal with the second predetermined position signal to find out that the position is offset to the left). In this case, the offset correction controller transmits the offset correction signal and controls the offset collection mechanism 21 to correct the offset towards the right.

If the conveying of the non-uniform thickness current collector 10 is offset to the right, the point where the abrupt voltage change is a negative value is offset to the right. Accordingly, the position of the point, where the abrupt voltage change is a negative value, detected by the position sensor is a first position signal and the first position signal is transmitted to the offset correction controller; and the offset collection controller compares the first position signal with the first predetermined position signal to find out that the position is offset to the right (the position of the point, where the abrupt voltage change is a positive value, detected by the position sensor is a second position signal and the second position signal is transmitted to the offset correction controller; and the offset correction controller compares the second position signal with the second predetermined position signal to find out that the position is offset to the right). In this case, the offset correction controller transmits the offset correction signal and controls the offset correction mechanism 21 to correct the offset towards the left.

It should be noted that the position sensor is an existing position sensor, and a position sensor is within the protection scope of the present disclosure as long as the position sensor can detect the position information of the abrupt thickness change point.

Optionally, the offset correction mechanism 21 includes au offset correction motor (not shown), an offset correction frame (not shown), a first offset correction roller 211, and a second offset correction roller 212. An output shaft of the offset correction motor is connected to the offset correction frame. The first offset correction passing roller 2133 and the second offset correction passing roller 2134 are both fixed on the offset correction frame. The offset correction controller is electrically connected to the offset correction motor.

During the conveying process, the non-uniform thickness current collector 10 passes by the first offset correction roller 211 and the second offset correction roller 212 in turn. The offset correction controller transmits the first offset correction signal to the offset correction motor, the offset correction motor operates after receiving the first offset correction signal, and controls the offset correction frame to be offset to the left, and the first offset correction passing roller 2133 and the second offset correction passing roller 2134 fixed on the offset correction frame correct the offset of the non-uniform thickness current collector 10 towards the left. In a case where the offset correction controller transmits the second offset correction signal to the offset correction motor, the offset correction motor operates after receiving the second offset correction signal, and controls the offset correction frame to be offset to the right, and the first offset correction passing roller 2133 and the second offset correction passing roller 2134 fixed on the offset correction frame 2134 corrects the offset of the non-uniform thickness current collector 10 towards the right.

In order to make the detection structure of the eddy-current thickness sensor more accurate, optionally, a second passing roller 26 is also included. The conveying path passes by a peripheral surface of the second offset correction roller 212 and a peripheral surface of the second passing roller 26 in turn. A wrapping angle is formed on each of the second offset correction roller 212 and the second passing roller 26. The second passing roller 26 is located upstream of the first passing roller 23. The non-uniform thickness current collector 10 is arranged horizontally when passing through between the peripheral surface of the second offset correction roller 212 and the peripheral surface of the second passing roller 26. The first sensor 221 and the second sensor 222 are arranged on an upper side and a lower side of the non-uniform thickness current collector 10, respectively. The non-uniform thickness current collector 10 is arranged horizontally. The frame body 223 is movable horizontally to in a left-right direction. In this way, the thickness detection of the non-uniform thickness current collector 10 is more accurate.

In the embodiments of the present disclosure, the tension blocking mechanism 24 is located between the first passing roller 23 and the coating back roller 251. With the arrangement of the tension blocking mechanism 24, the non-uniform thickness current collector 10 located upstream and downstream of the tension blocking mechanism 24 can be blocked from tension, and the tension fluctuation of the first passing roller 23 upstream can be prevented from causing the non-uniform thickness current collector 10 on the coating back roller 251 to wrinkle and affecting the coating effect or breaking the strip.

Optionally, the tension blocking mechanism 24 includes a drive roller 241 and a press roller 242. The conveying path passes through between the drive roller 241 and the press roller 242. The press roller 242 is configured to apply a pressure on the non-uniform thickness current collector 10 in the conveying path. Through the cooperative setting of the drive roller 241 and the press roller 242, the non-uniform thickness current collector 10 located upstream and downstream of the drive roller 241 can be blocked from tension, which can further avoid the wrinkles of the non-uniform thickness current collector 10 at the coating back roller 251, and provide better coating effect.

An outer diameter of the drive roller 241 is larger than an outer diameter of the press roller 242. The conveying path forms a wrapping angle on the drive roller 241, and the non-uniform thickness current collector 10 forms a wrapping angle on the drive roller 241. Optionally, forming a wrapping angle on the drive roller 241 can avoid wrinkling of the non-uniform thickness current collector 10, and the smaller outer diameter of the press roller 242 can save the space occupied by the coating device.

In the embodiments of the present disclosure, the first passing roller 23 is located between the second passing roller 26 and the tension blocking mechanism 24. The conveying path passes by a peripheral surface of the first passing roller 23. A length of the conveying path between the drive roller 241 and the coating back roller 251 is smaller than a length of the conveying path between the drive roller 241 and the first passing roller 23. The distance between the drive roller 241 and the tension blocking mechanism 24 is small, no other rollers will cause tension fluctuations, and the tension is more stable, to facilitate subsequent coating.

The length of the conveying path between the drive roller 241 and the coating back roller 251 refers to a distance between a line where the non-uniform thickness current collector 10 leaves the drive roller 241 and a line where the non-uniform thickness current collector 10 enters the coating back roller 251, i.e., a distance between the non-uniform thickness current collector 10 at an outlet end of the drive roller 241 and the uniform thickness current collector 10 at an inlet end of the coating back roller 251. The length of the conveying path between the drive roller 241 and the first passing roller 23 refers to a distance between a line where the non-uniform thickness current collector 10 leaves the first passing roller 23 and a line where the non-uniform thickness current collector 10 enters the drive roller 241, i.e., a distance between the non-uniform thickness current collector 10 at an outlet end of the first passing roller 23 and the non-uniform thickness current collector 10 at an inlet end of the drive roller 241.

It should be noted that, according to the actual production requirements, the coating device 20 may further include a plurality of passing rollers, and during the conveying process, the non-uniform thickness current collector 10 are in a tensioned state to be conveyed and coated.

As for a second coating method, the coating device 20 provided for the second coating manner is an improvement based on the technical solution of the coating device 20 provided for the first coating method. The technical solution of the first coating method is also applicable to the technical solution of the second coating method, and the differences are mainly described in detail below.

Figure 7:
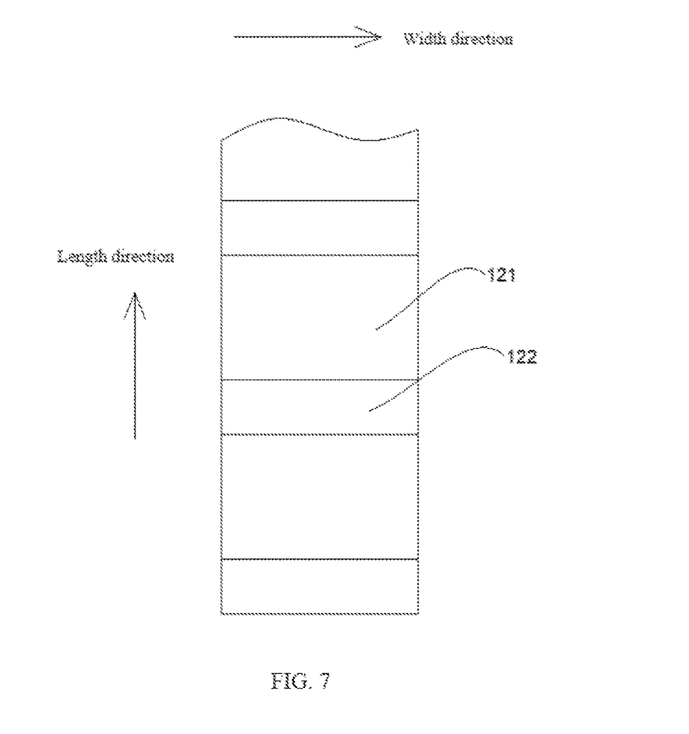
FIG. 7 is a schematic diagram of a second plane structure of a non-uniform thickness current collector.

FIG. 7 is a schematic diagram of a second plane structure of the non-uniform thickness current collector 10 in the second coating method. Referring to FIG. 7, the non-uniform thickness current collector 10 is a long roll material with a certain width. The coating areas 121 and the tab areas 122 all extend along the width direction of the non-uniform thickness current collector 10. The coating areas 121 alternate with the tab areas 122 in a length direction of the non-uniform thickness current collector 10. That is to say, when the non-uniform thickness current collector 10 is arranged on the coating device 20, the extending directions of the coating areas 121 and the tab areas 122 are approximately perpendicular to the extending direction of the non-uniform thickness current collector 10.

The width direction indicated by the arrow in FIG. 7 is the extending direction of the tab areas 122 and the coating areas 121, and the length direction indicated by the arrow in FIG. 7 is the conveying direction of the non-uniform thickness current collector 10 after the non-uniform thickness current collector 10 is arranged on the coating device 20.

Figure 8:
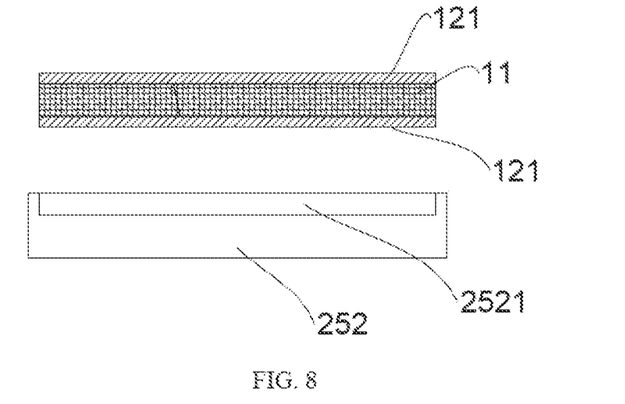
FIG. 8 is a schematic diagram of a second position configuration in which a coating die head corresponds to a non-uniform thickness current collector.

FIG. 8 is a schematic diagram of a second position configuration in which a coating die head 252 corresponds to a non-uniform thickness current collector 10. Referring to FIG. 8, one nozzle 2521 is arranged on the coating die head 252, and the nozzle 2521 can coat the coating areas 121 over the width of the non-uniform thickness current collector 10. Optionally, the nozzle 2521 is a flat nozzle, and a length of the flat nozzle corresponds to the width of the non-uniform thickness current collector 10. After the nozzle 2521 of the coating die head 252 is opened, the non-uniform thickness current collector 10 in the width direction can be coated.

The coating controller is electrically connected to the coating die head 252 and is configured to control the coating die head 252 to be turned on or turned off. After the non-uniform thickness current collector 10 is conveyed to the peripheral surface of the coating back roller 251, the non-uniform thickness current collector 10 located on the coating back roller 251 is a tab area 122 or a coating area 121, the tab area 122 alternating with the coating area 121. When the non-uniform thickness current collector 10 corresponding to the nozzle 2521 of the coating die head 252 is the coating area 121, the coating controller controls the coating die head 252 to be turned on and spray the slurry through the nozzle 2521 to coat the coating area 121. When the non-uniform thickness current collector 10 corresponding to the nozzle 2521 of the coating die head 252 is the tab area 122, the coating controller controls the coating die head 252 to be turned off, to prevent the nozzle 2521 from spraying the slurry and avoid applying the slurry at the tab area 122.

In the embodiments of the present disclosure, the coating controller is electrically connected to the thickness sensor 22. The coating back roller 251 has a coating region thereon. The thickness sensor 22 obtains a first signal in response to detecting a thickness decrease of the non-uniform thickness current collector 10 at an inlet end of the coating region (indicating that the coating area 121 of the non-uniform thickness current collector 10 enters the coating back roller 251), and transmits the first signal to the coating controller, and the coating controller controls the coating die head 252 to be turned on to coat the coating area 121. The thickness sensor 22 obtains a second signal in response to detecting a thickness increase of the non-uniform thickness current collector 10 at the inlet end of the coating region (indicating that the tab area 122 of the non-uniform thickness current collector 10 enters the coating back roller 251), and transmits the second signal to the coating controller, and the coating controller controls the coating die head 252 to be turned off to avoid coating the tab area 122.

Optionally, the thickness sensor 22 is located on a surface of the non-uniform thickness current collector 10. When the first sensor 221 and the second sensor 222 scan the non-uniform thickness current collector 10, the non-uniform thickness current collector 10 is continuously conveyed to the downstream, but the positions of the frame body 223 of the U-shaped structure and the first sensor 221 and the second sensor 222 mounted on the frame body 223 remain unchanged. A conveying length from a point of the non-uniform thickness current collector 10 (the non-uniform thickness current collector 10 at the eddy-current thickness sensor) through which a connection line of the sensor probe of the first sensor 221 and the sensor probe of the second sensor 222 passes to the inlet end of the coating region is a fixed value, assuming a distance of the conveying length is S3.

Under normal circumstances, a distance, in the length direction, of each segment of coating area 121 is a fixed value; a distance, in the conveying direction, of each segment of tab area 122 is a fixed value L1; a distance, in the conveying direction, of each segment of coating area 121 is a fixed value L2, and a conveying speed of the non-uniform thickness current collector 10 is a fixed value V. Therefore, a time length for conveying the non-uniform thickness current collector 10 from the eddy-current sensor (a position of the non-uniform thickness current collector 10 through which the connection line of the sensor probe of the first sensor 221 and the sensor probe of the second sensor 222 passes) to the coating region is a fixed value T1, where T1=S3/V.

When the abrupt voltage change of the eddy-current thickness sensor is a negative value, it indicates that the first sensor 221 and the second sensor 222 detect a change from a thicker tab area 122 to a thinner coating area 121. At this time, the eddy-current thickness sensor transmits the signal to the coating controller. Because the time length for conveying the detected coating area 121 to the inlet end of the coating region is T1, the coating controller controls the coating die head 252 to be turned on after a lapse of the time length T1, and the coating die head 252 just coats the coating area 121 at the inlet end of the coating region. After the non-uniform thickness current collector 10 is conveyed for a time length T2, when the abrupt voltage change is a positive value, indicating that the first sensor 221 and the second sensor 222 detect a change from a thinner coating area 121 to a thicker tab area 122, then the coating die head 252 is turned on for a tune length T2 and then closed. After the non-uniform thickness current collector 10 is conveyed for a time length T3, the abrupt voltage change is a negative value, indicating that the first sensor 221 and the second sensor 222 detect a change from a thicker tab area 122 to a thinner coating area 121, and then the coating die head 252 is turned off for a time length T3 and then turned on. That is to say, under normal circumstances, during the conveying process of the non-uniform thickness current collector 10, as long as a time interval from a negative abrupt voltage change to a positive abrupt voltage change is T2 and a time interval from a positive abrupt voltage change to a negative abrupt voltage change is T3, the coating controller does not need to re-transmit a control signal to the coating die head 252, and the coating controller controls the coating die head 252 to be turned on for a time length T2 and then turned off for a time length T3 according to the rule, and so on.

During the production of the non-uniform thickness current collector 10, if a length of one segment of coating area 121 or tab area 122 changes, or the conveying speed of the non-uniform thickness current collector 10 changes, the timing of turning on and turning off the coating die head 252 is required to be adjusted. Details are as follows.

If the length of a segment of coating area 121 is too long during the production of the non-uniform thickness current collector 10, the signal of the abrupt voltage change being a negative value and the signal of the abrupt voltage change being a positive value are transmitted to the coating controller, the time length calculated by the coating controller is greater than T2, and the coating controller controls the coating die head 252 to be turned on for a time length greater than T2 after a lapse of a time length T1. If a length of a segment of coating area 121 is too short, the signal of the abrupt voltage change being a negative value and the signal of the abrupt voltage change being a positive value are transmitted to the coating controller, the time length calculated by the coating controller is less than T2, and the coating controller controls the coating die head 252 to be turned on for a time length less than T2 after a lapse of a time length T1. The turning-on time length of the coating die head 252 is based on a time interval between an actual negative abrupt voltage change and an actual positive abrupt voltage change.

If a length of a segment of tab area 122 is too long during the production of the non-uniform thickness current collector 10, the signal of the abrupt voltage change being a positive value and the signal of the abrupt voltage change being a negative value are transmitted to the coating controller, the time length calculated by the coating controller is greater than T3, and the coating controller controls the coating die head 252 to be turned off for a time length greater than T3 after a lapse of a time length T1. If a length of a segment of tab area 122 is too short, the signal of the abrupt voltage change being a positive value and the signal of the abrupt voltage change being a negative value are transmitted to the coating controller, the time length calculated by the coating controller is less than T3, and the coating controller controls the coating die head 252 is turned off for a time length less than T3 after a lapse of a time length T1. The honing-off time length of the coating die head 252 is based on a time interval between an actual positive abrupt voltage change and an actual negative abrupt voltage change.

If the conveying of the non-uniform thickness current collector 10 slows down during the conveying process, the signal of the abrupt voltage change being a negative value and the signal of the abrupt voltage change being a positive value are transmitted to the coating controller, the time length calculated by the coating controller is greater than T2, and the coating controller controls the coating die head 252 to be turned on for a time length greater than T2 after a lapse of a time length T1. If the conveying of the non-uniform thickness current collector 10 becomes faster, the signal of the abrupt voltage change being a negative value and the signal of the abrupt voltage change being a positive value are transmitted to the coating controller, the time length calculated by the coating controller is less than T2, and the coating controller controls the coating die head 252 to be turned on for a time length less than T2 after a lapse of a time length T1. The turning-on time length of the coating die head 252 is based on a time interval between an actual negative abrupt voltage change and an actual positive abrupt voltage change.

If the conveying of the non-uniform thickness current collector 10 slows down during the conveying process, the signal of the abrupt voltage change being a positive value and the signal of the abrupt voltage change being a negative value are transmitted to the coating controller, the time length calculated by the coating controller is greater than T3, and the coating controller controls the coating die head 252 to be turned off for a time length greater than T3 time after a lapse of a time length T1. If the conveying of the non-uniform thickness current collector 10 becomes faster, the signal of the abrupt voltage change being a positive value and the signal of the abrupt voltage change being a negative value are transmitted to the coating controller, the time length calculated by the coating controller is less than T3, and the coating controller controls the coating die head 252 to be turned off for a time length less than T3 after a lapse of a time length T1. The turning-off tune of the coating die head 252 is based on a time interval between an actual positive abrupt voltage change and an actual negative abrupt voltage change.

If the conveying becomes normal again after a period of change, then the coating die head 252 is controlled to be turned on for a time length T2 and then turned off for a time length T3, and so on. Through the above setting, the coating area 121 of the non-uniform thickness current collector 10 can be accurately coated during the conveying process of the non-uniform thickness current collector 10, and the tab area 122 can be prevented from being coated.

In other embodiments, the signal of the abrupt voltage change being a negative value and the signal of the abrupt voltage change being a positive value each time can be transmitted to the coating controller, and the coating controller constantly calculates the time difference from the positive abrupt change value to the negative abrupt change value, and the time difference from the negative abrupt change value to the positive abrupt change value, and thereby controls the turning-on time length and the turning-off time length of the coating die head 252 to perform accurate coating.

It should be noted that since the distance between the thickness sensor 22 and the coating die head 252 is fixed, it takes time for the thickness sensor 22 to transmit the signal to the coating controller, and for the coating controller to transmit a control signal to control the coating die head 252 to be turned on or to be turned off. Therefore, the setting of a certain delay time is necessary.

In the second coating method, the offset correction mechanism 21 can be an automatic offset correction mechanism 21, which can correct the offset of the non-uniform thickness current collector 10 during conveying process.

The above is only a part of the embodiments of the present disclosure, and is not intended to limit the present disclosure. For those skilled in the art, the present disclosure may have various modifications and changes. Any modification, equivalent replacement, improvement, etc. made within the ideas and principle of the present disclosure shall be included within the protection scope of the present disclosure.

INDUSTRIAL APPLICABILITY

The coating device of the present disclosure can accurately coat the coating areas of the non-uniform thickness current collector without coating the tab areas, thereby ensuring more reasonable distribution of the active material on the non-uniform thickness current collector. In this way, the active material layer is formed on the coating areas, and the tab areas do not contain the active material, so that the non-uniform thickness current collector can meet the requirement for the current-passing capability of the tab areas. In addition, the waste of the metal deposition layer on the coating area is avoided. Therefore, the coating device of the present disclosure has a good application prospect in the secondary battery, and is suitable for industrial production.

What is claimed is:

1. A device for conveying a non-uniform thickness current collector, the device comprising:
    a thickness sensor configured to detect a thickness change point at a tab area on the non-uniform thickness current collector having a thickness that is unequal to a thickness of a coating area on the non-uniform thickness current collector and output a change point signal;
    an offset correction controller configured to receive the change point signal, compare the change point signal with a predetermined thickness change point signal, determine whether the non-uniform thickness current collector is offset and what an offset direction is, and transmit an offset correction signal; and
    an offset correction mechanism configured to receive the offset correction signal and perform an offset correction action on a conveying of the non-uniform thickness current collector in a direction opposite to the offset direction, wherein the offset correction mechanism and the thickness sensor are arranged in sequence along a conveying path of the non-uniform thickness current collector.

2. The device according to claim 1, wherein the thickness sensor is configured to detect the thickness change point at a tab area on the non-uniform thickness current collector having a thickness that is unequal to a thickness of a coating area on the non-uniform thickness current collector and output a voltage change signal; and
    wherein the offset correction controller is configured to receive the voltage change signal, compare the voltage change signal with a predetermined voltage change signal, determine whether the non-uniform thickness current collector is offset and what the offset direction is, and transmit the offset correction signal.

3. The device according to claim 2, further comprising a position sensor that is synchronously movable with the thickness sensor, the position sensor being configured to detect a position of the thickness change point at a tab area on the non-uniform thickness current collector having a thickness that is unequal to a thickness of a coating area on the non-uniform thickness current collector and output a position signal, wherein the offset correction controller is configured to receive the position signal indicating the thickness change point, compare the position signal with a predetermined thickness change point position signal, determine whether the non-uniform thickness current collector is offset and what the offset direction is, and transmit the offset correction signal.

4. The device according to claim 2, wherein the thickness sensor is configured to reciprocate in a width direction of the non-uniform thickness current collector and is located at a surface of the non-uniform thickness current collector; and the thickness sensor is configured to output the change point signal in response to detecting a first thickness change point at a tab area on the non-uniform thickness current collector having a thickness that is unequal to a thickness of a coating area on the non-uniform thickness current collector when scanning for a period of movement of the thickness sensor; and
    wherein the offset correction controller is configured to, subsequent to receiving the change point signal, calculate timing of appearance of the change point signal, compare the timing with a predetermined change point signal appearance timing, determine whether the non-uniform thickness current collector is offset and what the offset direction is, and transmit the offset correction signal.

5. The device according to claim 2, wherein the thickness sensor is configured to detect thickness change points at tab areas on the non-uniform thickness current collector having thicknesses that are unequal to thicknesses of coating areas on the non-uniform thickness current collector and output a plurality of voltage change values, wherein when the thickness sensor detects a thickness decrease of the non-uniform thickness current collector, a voltage change value corresponding to the thickness decrease of the non-uniform thickness current collector is a positive value or a negative value, and when the thickness sensor detects a thickness increase of the non-uniform thickness current collector, a voltage change value corresponding to the thickness increase of the non-uniform thickness current collector is a negative value or a positive value; and
    wherein the offset correction controller is configured to, subsequent to receiving the plurality of voltage change values, compare a number of positive values among the plurality of voltage change values with a predetermined number of positive values, compare a number of negative values among the plurality of voltage change values with a predetermined number of negative values, and determine the offset direction of the non-uniform thickness current collector.

6. The device according to claim 1, wherein along the conveying path, the offset correction mechanism is located upstream of the thickness sensor.

7. The device according to claim 1, wherein:
the thickness sensor is an eddy-current thickness sensor;
the eddy-current thickness sensor comprises a first sensor, a second sensor, and a frame body, wherein the frame body is of a U-shaped structure, wherein the first sensor and the second sensor are arranged on two ends of the U-shaped structure, respectively, and are both arranged on an inner side of the U-shaped structure; and
the first sensor and the second sensor are arranged at an upper side and a lower side of the non-uniform thickness current collector, respectively.

8. The device according to claim 1, wherein the offset correction mechanism comprises an offset correction motor, an offset correction frame, a first offset correction roller and a second offset correction roller, wherein the offset motor has an output shaft connected to the offset correction frame, wherein the first offset correction roller and the second offset correction roller are both fixed on the offset correction frame, and wherein the offset correction controller is electrically connected to the offset correction motor.

9. The device according to claim 1, wherein the non-uniform thickness current collector comprises coating areas and tab areas, the coating areas alternating with the tab areas along a width direction of the non-uniform thickness current collector, the coating areas and the tab areas all extending along a length direction of the non-uniform thickness current collector, and a thickness of each of the tab areas being greater than a thickness of each of the coating areas.

10. A coating device for coating a non-uniform thickness current collector with an active material to form an active material layer, the coating device comprising:
a thickness sensor configured to detect a thickness change point at a tab area on the non-uniform thickness current collector having a thickness that is unequal to a thickness of a coating area on the non-uniform thickness current collector and output a change point signal;
an offset correction controller configured to receive the change point signal, compare the change point signal with a predetermined thickness change point signal, determine whether the non-uniform thickness current collector is offset and what an offset direction is, and transmit an offset correction signal;
an offset correction mechanism configured to receive the offset correction signal and perform an offset correction action on a conveying of the non-uniform thickness current collector in a direction opposite to the offset direction, wherein the offset correction mechanism and the thickness sensor are arranged in sequence along a conveying path of the non-uniform thickness current collector; and
a coating back roller and a coating die head, wherein the conveying path passes by a peripheral surface of the coating back roller, wherein the coating back roller is located downstream of the thickness sensor, and wherein the coating die head faces towards a part of the conveying path on the coating back roller.

11. The coating device according to claim 10, wherein the coating die head has a plurality of nozzles arranged at intervals, the plurality of nozzles each corresponding to a coating area, wherein a shielding portion is arranged between two adjacent nozzles of the plurality of nozzles, the shielding portion corresponding to a position of a tab area on the non-uniform thickness current collector.

12. The coating device according to claim 10, further comprising a tension blocking mechanism located in the conveying path and between the thickness sensor and the coating back roller,
wherein the tension blocking mechanism comprises a drive roller and a press roller, the conveying path passing through between the drive roller and the press roller, and the press roller being configured to apply a pressure on the non-uniform thickness current collector in the conveying path, and
wherein the drive roller has an outer diameter larger than an outer diameter of the press roller, and wherein the conveying path forms a wrapping angle on the drive roller.

13. The coating device according to claim 12, further comprising:
a first passing roller located between the thickness sensor and the tension blocking mechanism, wherein the conveying path passes by a peripheral surface of the first passing roller; and
a second passing roller located upstream of the first passing roller along the conveying path, wherein the conveying path passes by a peripheral surface of the second offset correction roller and a peripheral surface of the second passing roller and forms a wrapping angle on each of the second offset correction roller and the second passing roller,
wherein a length of the conveying path between the drive roller and the coating back roller is smaller than a length of the conveying path between the drive roller and the first passing roller.

14. The coating device according to claim 10, wherein
the coating die head is configured to coat the non-uniform thickness current collector; and
the coating device further comprises a coating controller configured to control the coating die head to be turned on or turned off, the coating controller being electrically connected to the thickness sensor,
wherein the coating back roller has a coating region;
wherein the thickness sensor is further configured to obtain a first signal in response to detecting a thickness decrease of the non-uniform thickness current collector at an inlet end of the coating region, and transmit the first signal to the coating controller to allow the coating controller to control the coating die head to be turned on; and
wherein the thickness sensor is further configured to obtain a second signal in response to detecting a thickness increase of the non-uniform thickness current collector at the inlet end of the coating region, and transmit the second signal to the coating controller to allow the coating controller to control the coating die head to be turned off.

15. The coating device according to claim 14, wherein the non-uniform thickness current collector comprises coating areas and tab areas, the coating areas alternating with the tab areas along a length direction of the non-uniform thickness current collector, the coating areas and the tab areas all extending along a width direction of the non-uniform thickness current collector, and a thickness of each of the tab areas being greater than a thickness of each of the coating areas.

* * * * *